United States Patent [19]

Po' et al.

[11] Patent Number: 5,331,065

[45] Date of Patent: Jul. 19, 1994

[54] PROCESS FOR PREPARING HIGH MOLECULAR WEIGHT POLYETHYLENE-TEREPHTHALATE FROM RECYCLED POLYETHYLENETEREPHTHALATE

[75] Inventors: Riccardo Po', Novara; Nicoletta Cardi, Olgiate Olona; Luisa Fiocca, Novara; Antonio Gennaro, Cameri; Giorgio Giannotta, Milan; Ernesto Occhiello, Novara, all of Italy

[73] Assignees: Eniricerche S.p.A.; Enichem S.p.A., both of Milan, Italy

[21] Appl. No.: 88,314

[22] Filed: Jul. 7, 1993

[30] Foreign Application Priority Data

Jul. 15, 1992 [IT] Italy ............... MI.92-A/001713

[51] Int. Cl.$^5$ .............................. C08L 67/02
[52] U.S. Cl. ........................................ 525/437
[58] Field of Search ............................. 525/437

[56] References Cited

U.S. PATENT DOCUMENTS 3,959,215  5/1976  Schneider ............. 525/437
4,331,800  5/1982  Inata ..................... 525/437
4,351,936  9/1982  Matsumura .......... 525/437

FOREIGN PATENT DOCUMENTS 0416288  3/1991  European Pat. Off.

OTHER PUBLICATIONS

JP 63000313 Database WPI, Week 8806, Derwent Publications Ltd., GB (abstract).
JP 2199157 Database WPI, Week 9037, Derwent Publications Ltd., GB (abstract).

Primary Examiner—Patricia A. Short
Attorney, Agent, or Firm—George P. Hoare, Jr.

[57] ABSTRACT

Polyethyleneterephthalate (PET) originating from the sorted collection of solid urban refuse can be regraded and recycled as such or mixed with virgin PET if treated at high temperature with an oxazoline of general formula:

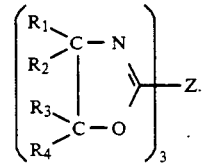

10 Claims, 1 Drawing Sheet

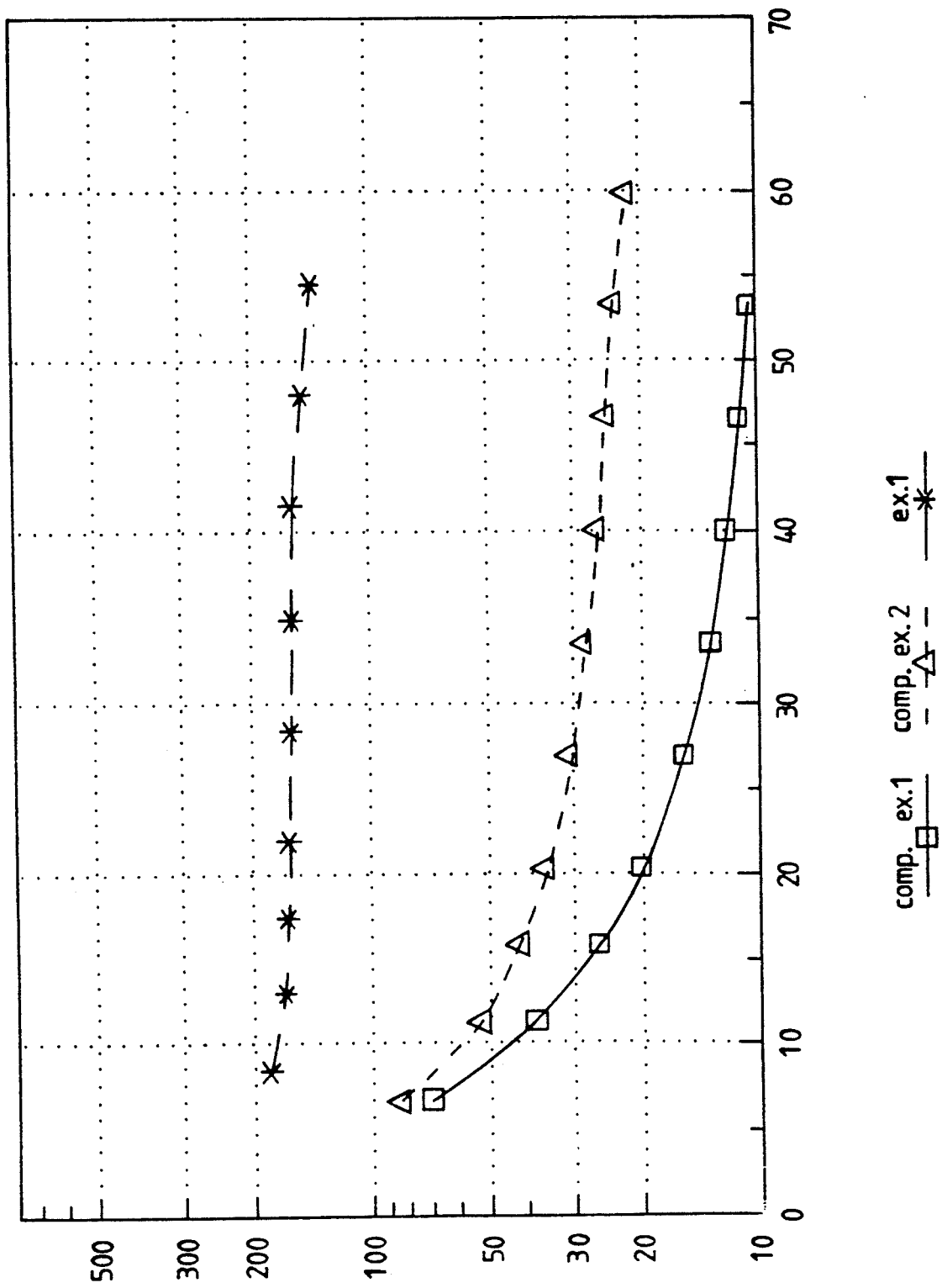

PROCESS FOR PREPARING HIGH MOLECULAR WEIGHT POLYETHYLENE-TEREPHTHALATE FROM RECYCLED POLYETHYLENETEREPHTHALATE

FIELD OF THE INVENTION

This invention relates to a process for preparing high molecular weight polyethyleneterephthalate (PET) from recycled polyethyleneterephthalate.

More specifically, the invention relates to a process for preparing high molecular weight polyethyleneterephthalate by regrading, with reactive modification, polyethyleneterephthalate originating from the sorted collection of liquid containers. For ecological and environmental reasons, the problem of the disposal of plastics materials present in solid urban refuse is now considered to be serious.

BACKGROUND OF THE INVENTION

In Italy the production of solid urban refuse currently increases by about 1% per year and is today estimated at 18/20 million tonnes per year, of which 1.4 million (about 7.5%) are plastics materials.

Recycling this large quantity of material would enable its salvage value to be recovered, leading to undoubted economic benefits, a reduction in the global volume of refuse and a reduction in the consumption of virgin materials. Its energy content could also be recovered by, at the end of its second cycle of life, incinerating it in a furnace using a suitable heat recovery method. A solution of wide impact, in terms of its applicability to different situations and to different treatable quantities, is the reuse of recycled polyethyleneterephthalate (PET), originating from the sorted collection of liquid containers, for the production of moulded articles by injection, extrusion or blow moulding.

From the literature, processes are known for recovering PET contained in mixtures of plastics materials originating from the sorted collection of solid urban refuse.

Published European patent application 291,959 describes a method for separating articles of polyolefin and/or PET construction from polyvinylchloride (PVC) articles by irradiating these articles with electromagnetic radiation. The separation is based on the greater capacity of chlorinated resins, such as PVC, to absorb the electromagnetic radiation than other non-chlorinated resins, with deviation of the articles to different destinations on the basis of the different absorption of the electromagnetic absorption. Published European patent application 469,904 describes a method for separating heterogeneous plastics materials into two homogeneous fractions, one consisting essentially on PET and the other one PVC, which comprises:
1) recovering a heavy fraction, consisting essentially of PET and PVC, by flotation in water;
2) treating the heavy fraction with acetone, which swells the PVC while leaving the PET unaltered;
3) stripping the absorbed acetone, which is recycled;
4) separating the PET from the swollen PVC by flotation in water or another liquid of greater density than water, However, the PET polymer fractions obtained by the aforesaid methods still contain substantial traces of PVC or other impurities (traces of paper, aluminium, adhesives etc.) which cause uncontrolled degradation of the polymer during the subsequent transformation stages in the molten state, with consequent undesirable formation of carboxyl groups and a lowering of the molecular weight. Further treatment aimed at increasing the PET purity could result in an increase in production cost to the extent of making the recovery process uneconomical. An alternative could be to regrade the recycled PET by reactive modification, preferably in the molten state, From the literature, additives are known which facilitate chain extension reactions of thermoplastic polyesters to give polymers of higher molecular weight and a reduced content of carboxyl groups.

Published Japanese patent applications 82-49,616 and 57-161,122 describe the use of cyclic bis(imino)ethers in chain extension reactions on PET and polyarylates.

Published Japanese patent applications 60-161,427 and 60-163,921 describe the use of 2,2'-(m-phenylene)-bis-2-oxazoline as a chain extender for PET, whereas in published Japanese patent application 63-313 this reagent is used in conjunction with 2,2'-bis-2-oxazoline.

However, as demonstrated hereinafter, in the case of recycled PET the stated additives allow only partially satisfactory results to be obtained. In this respect it has been verified that the rheological properties of these materials when in the molten state, in particular the apparent viscosity, tend to diminish with time, with evident repercussion on the processability of the polymer.

SUMMARY OF THE INVENTION

The present applicant has now found that determined trioxazolines are effective chain extenders able to give PET, when prepared from recycled PET, a viscosity in the molten state which is surprisingly higher than that resulting from the additives known in the literature, and which does not diminish with time.

The present invention therefore provides a process for preparing high molecular weight PET from recycled PET, comprising:
a) reacting the recycled PET at elevated temperature with at least one oxazoline of general formula:

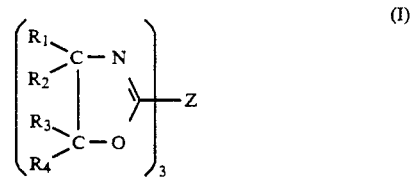

(I)

where $R_1$, $R_2$, $R_3$ and $R_4$, which can be the same or different, represent a hydrogen atom, a halogen such as chlorine, or an alkyl, cycloalkyl, aryl, alkylaryl, alkoxy or carboxyalkyl radical containing from 1 to 20 carbon atoms, and Z represents a trivalent linear, branched or cyclic aliphatic radical containing from 1 to 16 carbon atoms and possibly heteroatoms such as oxygen, sulphur or nitrogen, or Z represents an aromatic or alkylaromatic radical containing from 6 to 20 carbon atoms;

b) cooling the reaction product obtained to ambient temperature. The compounds of general formula (I) are known products and can be prepared as described in R. H. Wiley, L. L. Bennet, "Chemical Review", 44, 447 (1949).

Compounds of general formula (I) particularly suitable for the process of the present invention are those in which the radicals $R_1$–$R_4$ represent a hydrogen atom or a methyl group, and Z represents the trivalent radical 1,3,5-phenylene or 1,2,4-phenylene. Examples of products of formula (I) are: 2,2',2''-(1,3,5-phenylene)-tris-2-oxazoline; 2,2',2''-(1,2,4-phenylene)-tris-4,4-dimethyl-2-oxazoline; 2,2',2''-(1,3,5-phenylene)-tris-4,4-dimethyl-2-oxazoline; 2,2',2''-(1,2,4-phenylene)-tris-5-methyl-2-oxazoline; 2,2',2''(1,3,5-phenylene)-tris-5-methyl-2-oxazoline, etc.

In a preferred embodiment of the process of the present invention, the reaction between the recycled PET and the product of, general formula (I) takes place at a temperature in which the PET is in the molten state, or more generally at a temperature of between 240° and 350° C. The quantity of the compound of formula (I) used is between 0.05 and 10% by weight of the total mixture. A typical procedure for reacting recycled PET with compounds of general formula (I) comprises:
  i) mixing the recycled PET in the dry state with compounds of type (I) preceded by drying the polymer under vacuum at a temperature of between 80° and 150° C.;
  ii) heating to elevated temperature, above the polymer melting point, until the reaction has taken place;
  iii) cooling the product obtained to ambient temperature.

For the procedure of the present invention it is preferable to conduct steps i) to iii) with a continuous apparatus, such as a single-screw or double-screw extruder fitted with a granulation head.

The recycled PET used as raw material in the process of the present invention originates from the sorted collection of solid urban refuse, in particular from the collection of liquid containers. This material is available from Tecoplast of Casumaro di Ferrara (Ferrara), and is sorted by the method described in Italian Patent Appln. 3707A/87. The PET ragfaded by the process of the present invention has an inherent viscosity, when measured at a concentration of 0.25 g/dl in 50/50 phenol/trichlorobenzene at 30° C., which exceeds 0.5 dl/g and is generally between 0.65 and 3 dl/g, and can be used either alone or mixed with virgin PET in the production of moulded articles prepared by traditional thermoplastic polymer transforming methods, such as injection moulding or extrusion. It can be processed into film or fibres or used as a matrix for composite materials based on fibres or inorganic fillers. Finally, it can be used in mixture with other thermoplastic polymers or elastomers to improve their mechanical properties. Some examples are given hereinafter for purely illustrative purposes, and are not limitative of the scope of the invention.

BRIEF DESCRIPTION OF THE DRAWING

FIG. 1 is a graph plotting the respective curves of the viscosity of the molten product (P*s) as a function of the residence time (min.) in the capillary rheometer as pertains to the following examples.

COMPARATIVE EXAMPLE 1

Recycled PET originating from the sorted collection of liquid containers and supplied by Tecoplast of Casumaro di Ferrara (Ferrara) was ground in a quantity of 600 g in a mill and screened with sieves of 1 mm diameter mesh, after which it was dried for 8 hours at 120° C. and fed to an extruder.

A product was obtained having an inherent viscosity of 0.63 dl/g, a carboxyl number of 41 eq/$10^6$ g and a curve of viscosity of the molten product (Pa*s) against residence time (min) in the capillary rheometer as shown in FIG. 1.

For the PET regrading reaction a Rheomax TW-100-Haake System 90 counter-rotating two screw extruder was used, this having frusto-conical screws (diameter 20–31 mm, L 330 mm), four heating regions and a die of 3 mm diameter.

The polymer throughput was 2 kg/h, with a set speed of 70 rpm and a temperature profile of 250°–270° C.

The polymer was cooled in a cooling vessel and granulated. The inherent viscosity measurements were made with a Desreux-Bischoff viscometer on solutions of 0.25 g/dl concentration in 50/50 w/w phenol/trichlorobenzene at 30° C.

The viscosity measurements on the molten product were made under isothermal conditions (280° C.) at a shear rate of 210 sec$^{-1}$ using a Gottfert Rheograph 2002 capillary rheometer with a capillary of 1 mm diameter and 30 mm length.

Pressure was measured with a 500 bar transducer and converted into viscosity values in Pa*s using Poiseuille's law. The —COOH groups were determined by dissolving 200 mg of polymer in 5 ml of boiling benzyl alcohol. The polymer which precipitated on cooling to ambient temperature was redissolved by dilution with chloroform and the solution was titrated with NaOH in benzyl alcohol using methyl red as indicator.

COMPARATIVE EXAMPLE 2

530 g of recycled PET ground, sieved and dried as described in Comparative Example 1 were premixed in a V mixer with 5.3 g of 2,2'-(1,4-phenylene)-bis-2-oxazoline for 20 minutes. The mixture was processed by the procedure described in Comparative Example 1. A product was obtained having an inherent viscosity of 0.67 dl/g, a carboxyl number of 27 eq/$10^6$ g and a curve of viscosity of the molten product against residence time in the capillary rheometer as shown in FIG. 1.

EXAMPLE 1

600 g of recycled PET ground and sieved as in the comparative examples were dried for 8 hours at 120° C. and premixed in a V mixer with 5.4 g of 2,2',2''-(1,3,5-phenylene)-tris-2-oxazoline for 20 minutes.

The mixture was processed by the procedure described in Comparative Example 1.

A product was obtained having an inherent viscosity of 0.75 dl/g, a carboxyl number of 21 eq/$10^6$ g and a curve of viscosity of the molten product against residence time in the capillary rheometer as shown in FIG. 1.

We claim:

1. A process for preparing high molecular weight PET from recycled PET, comprising:
  a) reacting the recycled PET at elevated temperature with at least one oxazoline of general formula:

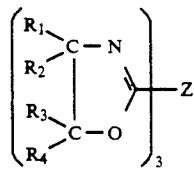

where $R_1$, $R_2$, $R_3$ and $R_4$, which can be the same or different, represent a hydrogen atom, a halogen, or an alkyl, cycloalkyl, aryl, alkylaryl, alkoxy or carboxyalkyl radical containing from 1 to 20 carbon atoms, and Z represents a trivalent linear, branched or cyclic aliphatic radical including from 1 to 16 carbon atoms or Z represents an aromatic or alkylaromatic radical containing from 6 to 20 carbon atoms;

b) cooling the reaction product obtained to ambient temperature.

2. A process for preparing high molecular weight PET from recycled PET as claimed in claim 1, wherein the compounds of general formula (I) are those in which the radicals $R_1$-$R_4$ represent a hydrogen atom or a methyl group, and Z represents the trivalent radical 1,3,5,-phenylene or 1, 2,4-phenylene.

3. A process for preparing high molecular weight PET from recycled PET as claimed in claim 1, wherein the reaction between the recycled PET and the product of general formula (I) takes place at a temperature in which the PET is in the molten state.

4. A process for preparing high molecular weight PET from recycled PET as claimed in claim 3, wherein the reaction between the recycled PET and the product of general formula (I) takes place at a temperature of between 240° and 350° C.

5. A process for preparing high molecular weight PET from recycled PET as claimed in claim 1, wherein the quantity of compounds of general formula (I) used is between 0.05 and 10% by weight of the total mixture.

6. A process for preparing high molecular weight PET from recycled PET as claimed in claim 1, comprising:

i) mixing the recycled PET in the dry state with compounds of type (I) preceded by drying the polymer under vacuum at a temperature of between 80° and 150° C.;

ii) heating to elevated temperature, above the polymer melting point, until the reaction has taken place;

iii) cooling the product obtained to ambient temperature.

7. A process for preparing high molecular weight PET from recycled PET as claimed in claim 6, wherein steps i) to iii) are carried out in an extruder.

8. A process for preparing high molecular weight PET from recycled PET as claimed in claim 1, wherein the halogen is chlorine.

9. A process for preparing high molecular weight PET from recycled PET as claimed in claim 1, wherein the aliphatic radical includes heteroatoms.

10. A process for preparing high molecular weight PET from recycled PET as claimed in claim 9, wherein the heteroatoms are oxygen, sulphur or nitrogen.

* * * * *